United States Patent [19]
Espig

[11] 4,047,210
[45] *Sept. 6, 1977

[54] CAMERA WITH AN ELECTRONIC TIMER AND INCLUDING AN ELECTRO-MECHANICAL DELAYED ACTION STOP FOR THE SHUTTER DRIVE

[75] Inventor: Winfried Espig, Calmbach, Black Forest, Germany

[73] Assignee: Prontor-Werk, Alfred Gauthier GmbH, Postfach, Germany

[*] Notice: The portion of the term of this patent subsequent to July 27, 1988, has been disclaimed.

[21] Appl. No.: 588,269

[22] Filed: June 19, 1975

Related U.S. Application Data

[63] Continuation of Ser. No. 143,200, May 13, 1971, abandoned, which is a continuation of Ser. No. 770,737, Oct. 25, 1968, abandoned.

[30] Foreign Application Priority Data

Oct. 26, 1967 Germany .......................... 1597365

[51] Int. Cl.² .............................................. G03B 9/64
[52] U.S. Cl. .................................. 354/238; 354/60 L; 354/60 A; 354/234
[58] Field of Search ....................... 354/29, 38, 50, 51, 354/60 R, 60 L, 60 A, 234, 238, 239

[56] References Cited

U.S. PATENT DOCUMENTS

| | | | |
|---|---|---|---|
| 3,223,013 | 12/1965 | Rentschler | 354/239 |
| 3,397,629 | 8/1968 | Mori et al. | 354/51 |
| 3,511,143 | 5/1970 | Rentschler | 354/51 |
| 3,595,154 | 7/1971 | Espig | 354/234 |
| 3,726,200 | 4/1973 | Ogiso et al. | 354/51 |

Primary Examiner—Russell E. Adams
Attorney, Agent, or Firm—Arthur A. March

[57] ABSTRACT

A camera is provided having an electronic timer controlled by ambient light. There is provided an electro-mechanical delayed action stop for the shutter. An electronic delay device is provided for temporarily delaying the action of the shutter of the camera after it has been released. An electronic switching device is provided including a signal lamp which is connected to the two poles of a battery. The switching device is so controlled in dependence upon the action of the delay device tht the signal lamp emits a distinctive light signal during the action of the delaying device and the subsequent exposure. A flashing circuit is arranged to provide a flashing signal during the delay period, the circuit being arranged to operate the lamp continuously during the exposure period.

5 Claims, 3 Drawing Figures

CAMERA WITH AN ELECTRONIC TIMER AND INCLUDING AN ELECTRO-MECHANICAL DELAYED ACTION STOP FOR THE SHUTTER DRIVE

This is a continuation of co-pending application Ser. No. 143,200, filed May 3, 1971 which in turn is a continuation of co-pending application Ser. No. 770,737, filed Oct. 25, 1968, both now abandoned.

The invention concerns a camera having a shutter timer controlled by ambient light and including an electro-mechanical delayed action for the shutter drive, both the shutter timing action and the delay being electronically controlled.

As known, the shutter action in such cameras, both during the delayed action time period between shutter release actuation and the beginning of the shutter action, and during the actual exposure procedure, occurs silently, so that the photographer is not certain during a delayed time exposure of the momentary state of the shutter action. To give the photographer clear indication concerning the shutter condition when manipulating an electronic camera of the type referred to, it has already been proposed to provide a light control which clearly indicates both the beginning and the end of the shutter action during the delayed action period but not, however, during the subsequent exposure. When taking a photograph the exposure of which is ambient light controlled, with relatively low light intensity, for example a night photograph, the photographer has no clue as to the time for which the shutter is open, so that there is a danger of the camera being moved before the end of the exposure.

The object of the present invention is to remove this drawback in an electronic camera of the kind referred to, with a minimum of structural involvement, and consists in that an additional switching device including a signal lamp is provided which is adapted to be connected to a battery and so controllable in dependence upon the action of the shutter control that the signal lamp emits different light signals during the delay period and the subsequent exposure. This tells the photographer the state of shutter action both during the delaying time and the subsequent exposure, the different light signals giving a clear indication as to whether the delaying device is in action or whether the exposure operation has started.

To provide a clear differentiation between the various light signals the additional signal circuit is so constructed that the signal lamp lights up intermittently in a manner of a flashing light during the action of the delay device and lights up continuously during the subsequent exposure. Reliable construction of the additional switching device, taking into account the restricted space conditions in a camera, is obtained since the switching device consists of a flashing circuit adapted to be connected to the battery, and a witching circuit connected to the input thereof, which circuit, when the delaying device has completed its action, changes the flashing circuit over to a continuous light condition. This permits the reduction of the number of electronic components for the switching circuit to a minimum, since the latter includes a change-over switch which in one contact position energizes the delaying device and when the latter has concluded its action, changes over into the other contact position whilst switching off the delaying device, in which contact position the flashing circuit is so operated that the flashing light changes over to a continuous light.

Preferably the switching circuit includes a transistor which is so operated by a further transistor belonging to the exposure time control circuit which follows upon the conclusion of action of the delaying device that the first-mentioned transistor remains blocked during the action of the delaying device and thereby enables the signal lamp to indicate intermittently, whereas the transistor conducts at the end of the delaying device action and hence causes the continuous light indication.

The invention is described in detail below by reference to a camera shutter provided with an electronic exposure timer and an electrical delayed action control circuit.

In the accompanying drawings.

Figure 1:
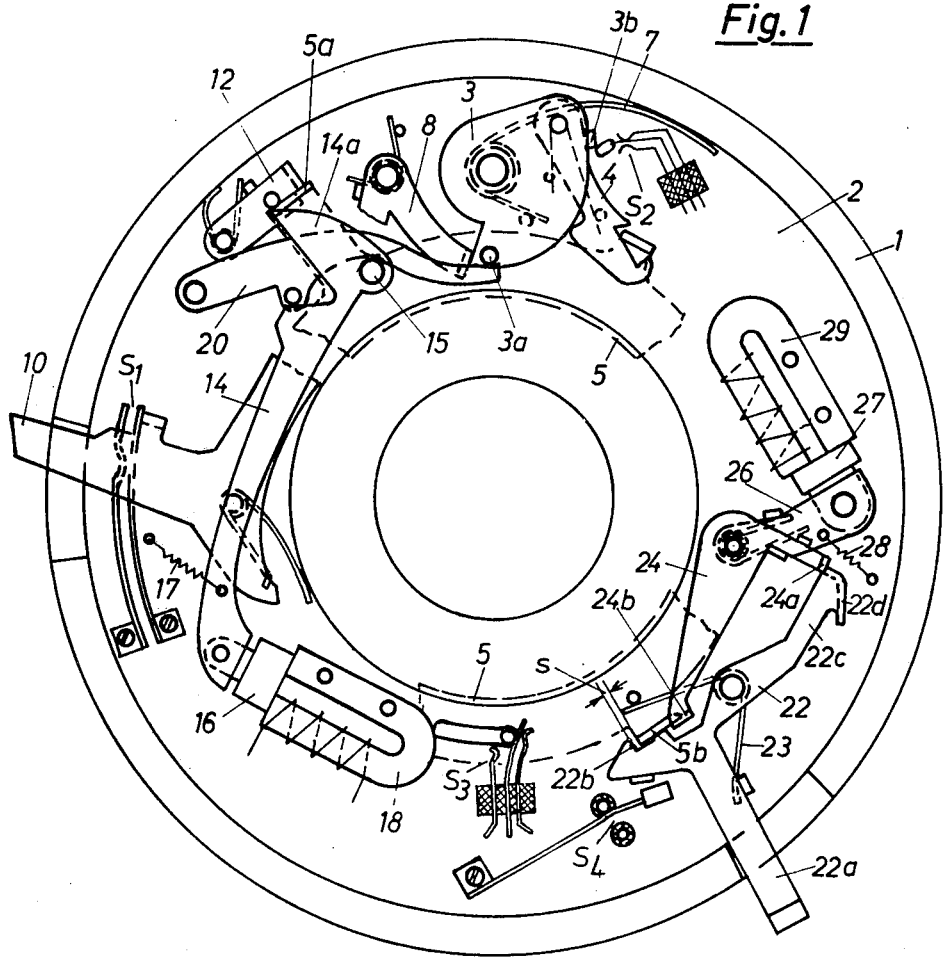
FIG. 1 shows a shutter cocked and prepared for delayed action exposures in plan view with the cover plate removed.

In accordance with FIG. 1 of the drawing a base plate 2 arranged in a shutter housing 1 carries a driving mechanism for the shutter segments, not shown. This driving mechanism is formed as a toggle drive and includes a rotatably mounted disc 3, a thrust pawl 4 connected thereto, and a shutter segment ring 5 engaging therewith. A driving spring 7 imparts to the disc 3 a rotary movement in a clockwise direction after release, the segment ring 5 executing a reciprocating movement. In the cocked position as shown in FIG. 1 the disc 3 is arrested by a two-armed release lever 8, which is moved out of the stop position by means of an actuating lever 10.

The shutter driving mechanism has an electronic timer associated therewith which includes an electro-mechanical delayed action stop. The latter has a catch lever 12 which at the end of the opening movement of the segment ring 5 slips off its arm 5a under spring action and assumes a position in front of the end face, whereby the shutter drive is blocked. After a certain time interval the catch lever 12 is moved by the lifting arm 14a of an armature lever 14 out of the stop position, so that the segment ring 5 is able to continue its movement to close the segments again. The armature lever 14 is supported on a pin 15 and carries an armature 16. The latter is caused to abut against an electromagnet 18 against the action of a return spring 17 when the shutter is cocked, for which purpose a pressing lever 20 is provided which during the cocking procedure is engaged by a pin 3a of the driving disc 3, which swings the armature lever against the electromagnet.

For carrying out delayed action exposures the shutter arrangement described above is provided with a device connected thereto and also electronically operated, which temporarily delays the shutter action directly after release. In accordance with the embodiment shown, this device has a three-armed stop lever 22 which is transferred by means of its arm 22a into the position shown in FIG. 1 against the action of a spring 23. In this position a catch edge 22b of the stop lever 22 assumes a position in front of a lug 5b of the segment ring 5. The arm 22c of the stop lever 22, which has a downwardly bent lug 22d, has a lever mechanism associated therewith consisting of a two-armed supporting lever 24 and a coaxially mounted armature lever 26. The levers 24 and 26 are interconnected by a spring. One end the lever 24 is provided with a lug 24a against which the stop lever 22 is supported in the locked position. As the other (resilient) end of the supporting lever 24 a downwardly bent lug 24b is provided which, when the stop lever 22 is moved into the locking position as shown in FIG. 1, assumes a position in front of the lug 5b of the segment ring 5. The armature lever 26 with its armature 27 is moved to abut an electromagnet 29 against the action of a return spring 28.

Figure 2:
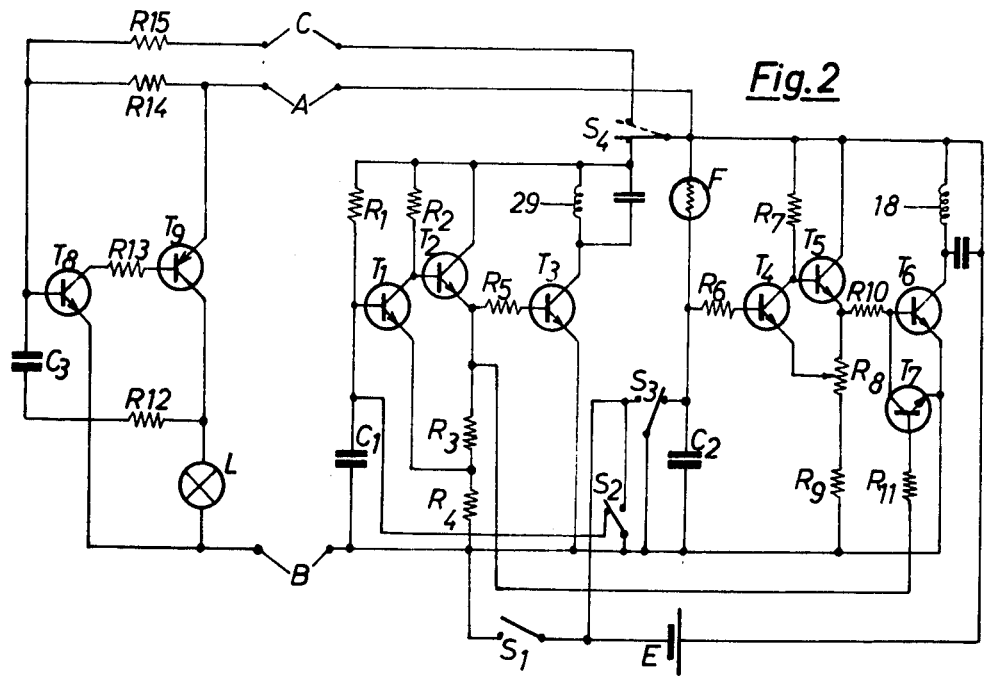
FIG. 2 shows the switching circuits of the electronic timer, the delayed action device and the additional switching device for the flashing and continuous light signals.
Figure 3:
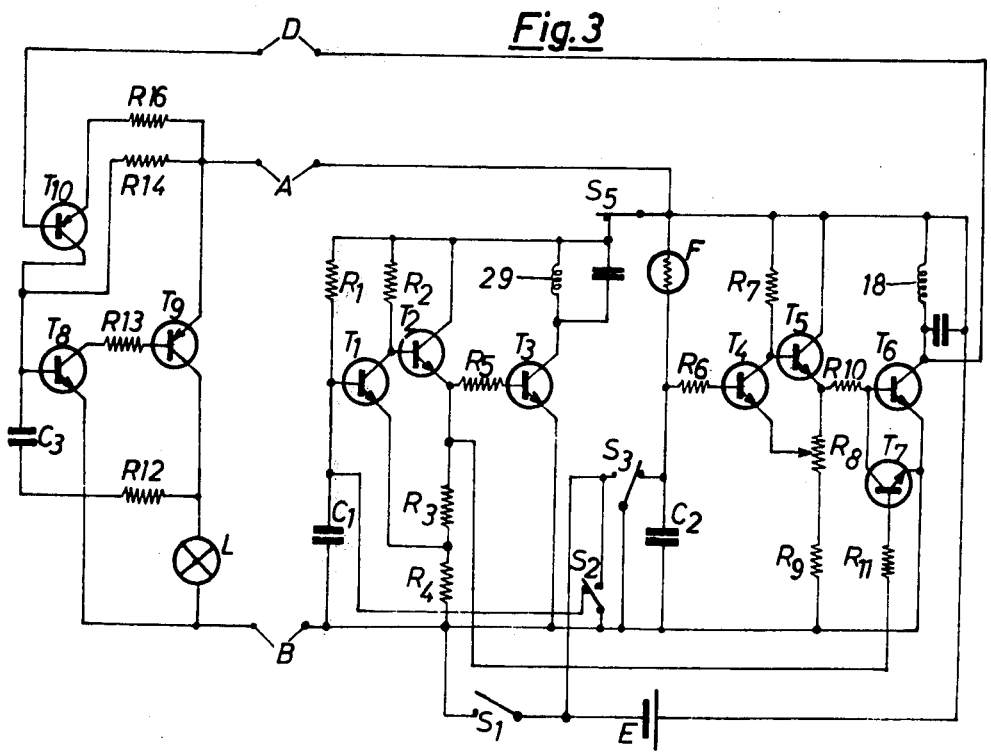
FIG. 3 shows an alternative circuit for the additional switching device, but using the same exposure timer and delayed action control circuit.

As already indicated, the delaying device operates electronically. For this purpose the electromagnet 29 of this device, as shown in FIGS. 2 and 3, is included in a transistorised relaxation circuit. The latter includes transistors $T_1$, $T_2$, and $T_3$ and the RC circuit formed by a resistor $R_1$ and a capacitor $C_1$. Further components of this circuit are the resistors $R_2$ to $R_5$, and their arrangement in the circuit is shown in FIGS. 2 and 3.

To control the exposure time, as shown in FIGS. 2 and 3, another transistorised circuit is also provided. The latter comprises the transistors $T_4$, $T_5$ and $T_6$, an RC circuit formed by a photoelectric resistor F and capacitor $C_2$, together with several resistors $R_6$ to $R_{10}$. The coil 18 of the electromagnet is located in the collector circuit of transistor $T_6$.

In circuit of the exposure time control there is a further transistor $T_7$, which performs the function of a switch with regard to the electromagnet 18. In accordance with the circuit diagram in FIG. 2 the switching transistor $T_7$ has its collector-emitter path connected in parallel with the base-emitter path of transistor $T_6$, its base being connected via a resistor $R_{11}$ to the emitter of the end transistor $T_2$ of the delay time control circuit.

By means of a switch $S_1$, which is closed by actuation of the lever 10, the above described circuits are connected to a battery E. A change-over switch $S_2$ in the contact position shown in FIGS. 1 and 2 short-circuits the capacitor $C_1$, whereas in the other contact position it establishes a parallel connection with switch $S_1$ in the delay time control circuit for the duration of the delayed action time. The switch $S_2$ is actuated by means of a lug 3b of the driving disc 3. The arrangement is such that directly after the start of the disc 3, but before the renewed locking of the driving mechanism by the stop lever 22, the switch $S_2$ is changed over into its other contact position, not shown, where it is retained for the duration of the delayed action. Switch $S_3$ has the same function with regard to the exposure time control circuit and is actuated by the segment ring 5. Change-over of the switch $S_3$ is effected directly after unlatching the segment ring 5 by the stop lever 22, but before the return of the switch $S_2$ into its short-circuit position. By means of a further switch $S_4$ one lead of the delay time control circuit in preparation for a delayed action exposure is connected to the battery E. For this the switch $S_4$ which is arranged as shown in FIG. 1 and formed as a change-over switch shown in FIG. 2, is arranged in the region of an arm of the stop lever 22 which in its normal position (not shown) provided for exposures without delay action, retains this switch in the contact position indicated by broken lines in FIG. 2. When the stop lever 22 is changed over to the stop position, the contact switch $S_4$ automatically changes over into the contact position shown in full in FIGS. 1 and 2.

Besides the electronic circuits for the delayed action and exposure time described above, the camera is provided with an additional electronic switching device which includes a signal lamp L. As shown in the circuit diagram of FIG. 2 this switching device includes a flashing circuit which is formed by two complementary transistors $T_8$ and $T_9$, a capacitor $C_3$ and resistors $R_{12}$ to $R_{14}$. The filament of the signal lamp L is the load resistance of the transistor $T_9$. The switching device also includes a switching circuit which is connected at the input of the flashing circuit and in the circuit diagram of FIG. 2 includes a resistor $R_{15}$ and the aforesaid change-over switch $S_4$. Connected to the source of energy E, the lamp signalling device is connected via links A, B and C to the delayed action and exposure time control circuits.

When carrying out an exposure with delayed action the stop lever 22 is moved into the position as shown in FIG. 1, the armature 27 being connected to the electromagnet 29 and the switch $S_4$ transferred into the position shown in FIG. 2 in full lines. Depression of the actuating lever 10 releases the driving disc 3 and simultaneously closes the switch $S_1$, so that the electronic delay device is connected to battery. The released segment ring 5 with its lug 5b strikes after a short distance a against the catch edge 22b of the stop lever 22, the driving disc 3 changing the switch $S_2$ over, so that the short-circuit across capacitor C1 is broken. However the action of the circuit after the actuating lever 10 is released or the switch $S_1$ is opened, is effected via the switch $S_2$. The capacitor $C_1$ now charges via the resistor $R_1$ to such a potential that transistor $T_1$ conducts. When this has occurred, the circuit relaxes resulting in de-energisation of electromagnet 29 so that armature 27 is released. The stop lever 22 ceases to be supported against the lever 24 and so releases the segment ring 5 which on reaching the open position, is blocked by the catch lever 12.

Closure of switch $S_1$ also connects point B with the battery E, so that the flasher circuit is connected to potential via A and B, with point C still de-energized. The transistors $T_8$ and $T_9$ are blocked. Capacitor C3 charges via the filament of lamp L, the resistor $R_{12}$ and the resistor $R_{14}$. When the threshold voltage of the transistor $T_8$ is reached, it commences to conduct. This causes the potential at the base of transistor $T_9$ to become negative. The latter now also begins to draw current, resulting in a drop in collector voltage of the transistor $T_9$. Owing to the coupling between the collector of $T_9$ and the base of transistor $T_8$ via the resistor $R_2$ and the capacitor $C_3$ the current in these two transistors rises until finally these are fully conductive. Hence the lamp L in the collector circuit of the transistor $T_9$ lights up. This state is maintained until the capacitor $C_3$ is charged to such an extent that its charging current is no longer sufficient to make transistor $T_8$ conductive. Since the resistor $R_{14}$ is selected such that the transistor $T_8$ cannot be made conductive through it, the circuit relaxes its normal position, causing the lamp L to be extinguished again. The capacitor $C_3$ now commences to be gradually charged in reverse via the resistor $R_{14}$, and the operation described above is repeated anew. In this way a flashing light signal is given by the additional switching device shown in FIG. 2 until the delayed action control ends its function. When this occurs, the stop lever 22 returns into its original position, releasing the segment ring 5, and the change-over switch $S_4$ changes back into the contact position shown in broken lines in FIG. 2, in which position link C is also connected to battery.

The segment ring 5 released by the stop lever 22 is again moved and finally strikes against the catch lever 12. During this movement switch $S_3$ is changed over, which causes capacitor $C_2$ to be charged, connects links A and B and the exposure time control circuit to battery. The exposure timer functions in such a manner that after a certain time interval the magnetic field in the electromagnet 18 collapses. This in turn results in the armature lever 14 being related by its spring 17 to move the catch lever 12 out of the stop position. The segment ring 5 then continues its movement and releases the shutter segments into their closed position.

The connection of battery to link C after the action of the delay device provides the base of the transistor $T_8$ with a positive potential via the resistor $R_{15}$. This resistor is of such a value that the transistor $T_8$ is made completely conductive, resulting in the transistor $T_9$ also being conductive. Therefore the flashing of lamp L during the action of the time delay control circuit is changed into a continuous illumination, which is maintained for as long as the shutter remains open. With the return of segment ring 5 into the normal position as shown in FIG. 2, the contact switch $S_3$ is transferred into the short-circuit position shown in FIG. 2, so that link B is cut and as a result the lamp L is extinguished.

In the schematic view shown in FIG. 3 the switching circuit by means of which the flashing action is cut out after the action of the delay device, includes a transistor $T_{10}$, the base of which is connected via link D to the collector circuit of transistor $T_6$ associated with the exposure time control circuit. The connections associated with transistor $T_{10}$ and an additional resistor $R_{16}$ are shown in FIG. 3. The circuits for the delaying device, the exposure timing device and the flasher connection are the same as those described above and shown in FIG. 2. The main difference is that the switch by means of which the delay device is energized, is a simple switch designated by $S_5$ in FIG. 3. This switch, when the stop lever 22 is transferred into the stop position, is changed over into the contact position shown in FIG. 3.

The operation of the circuit shown in FIG. 3, is such that when the actuating lever 10 is depressed, the contact switch $S_1$ is closed, and the lamp L begins to flash in the manner described and the delay device is brought into action. During this action transistor $T_6$ remains blocked on account of the action of the switching transistor $T_7$, whereby the base of the transistor $T_{10}$ receives a positive potential via the magnet coil 18, so that $T_{10}$ is also blocked and hence cannot affect the flashing circuit. On completion of the delayed action the transistor $T_6$ conducts and the contact switch $S_5$ is opened by the stop lever 22. The shutter drive action now takes place as before, the segment ring 5 again being blocked with the shutter open position over a certain period. When transistor $T_6$ conducts, the potential at the base of transistor $T_{10}$ goes negative, so that this transistor also conducts. The base of the transistor $T_8$ is connected via the collector-emitter path of transistor $T_{10}$ and the resistor $R_{16}$ to positive potential, causing $T_8$ to conduct and in turn to unblock transistor $T_9$. This state is maintained until the shutter is opened. By this means the intermittent flashing of the lamp L during the action of the delay device changes to a continuous light during the opening of the shutter.

What we claim is:

1. A camera having an electronic timer controlled by ambient light including an electro-mechanical delayed action stop for the shutter to stop the action of the shutter upon shutter release, an electronic delay device for delaying temporarily the action of the shutter after shutter release, and electronic switching means, including a battery-energizable signal lamp, responsive to the action of said delay device, and having means electronically controlled in dependence upon the action of said delay device for specifically generating distinctive and different light signals via said lamp respectively during the action of said delay device and the subsequent exposure period whereby to indicate to the operator the corresponding state of the shutter action continuously throughout the duration of the shutter operation upon shutter release and during both the action of said delay device and the subsequent exposure period.

2. A camera according to claim 1 wherein said electronic switching means includes means responsive to the action of said delay device by which said lamp is lighted intermittently during the action of said delay device and is lighted continuously upon completion of the action of said delay device and during the subsequent exposure period.

3. A camera according to claim 2 wherein said electronic switching means comprises a flashing circuit energizable by a battery, and means responsive to the action of said delay device for changing the flashing circuit upon completion of the action of said delay device into a stable state whereby said lamp is lighted continuously.

4. A camera according to claim 3 wherein said electronic switching means includes a change-over switch having one contact position to connect said delay for energization by the battery and another contact position arranged to disconnect said delay device in response to the action of said delay device and in turn to suppress said flashing circuit whereby said lamp is lighted continuously.

5. A camera according to claim 3 including a first transistor and a complementary second transistor, said second transistor being responsive to the action of said delay device and arranged to render operative said first transistor only upon completion of the action of said delay device, and said second transistor being changed from non-conductive to conductive condition only upon the completion of the action of said delay device and in turn rendering operative said first transistor whereby said lamp is lighted continuously.

* * * * *